Nov. 29, 1927. Re. 16,801

C. TO KENTRUP

VEHICLE LOCK

Original Filed July 6, 1922

INVENTOR.

Clemens J. Kentrup

BY

Allen & Allen

ATTORNEY.

Reissued Nov. 29, 1927.

Re. 16,801

UNITED STATES PATENT OFFICE.

CLEMENS TO KENTRUP, OF CHICAGO, ILLINOIS, ASSIGNOR TO THE GRAULOCK COMPANY, OF CINCINNATI, OHIO, A CORPORATION OF OHIO.

VEHICLE LOCK.

Original No. 1,471,982, dated October 23, 1923, Serial No. 573,112, filed July 6, 1922. Application for reissue filed October 16, 1925. Serial No. 62,944.

The object of the invention is to provide a simple and efficient lock for vehicles of the motor driven type and particularly to provide a device for this purpose which operates by cutting off the supply of fuel such as gasoline; and with this object in view the invention consists in a construction and combination of parts of which a preferred embodiment is shown in the accompanying drawings, wherein:—

Figure 1:
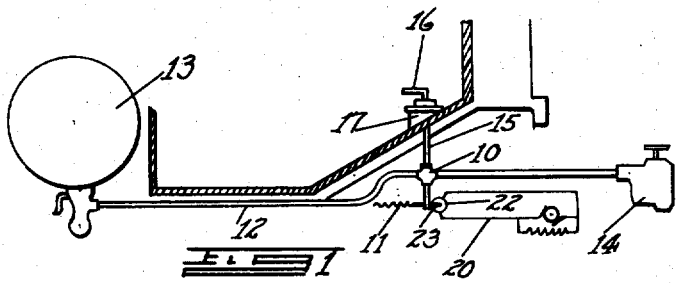
Figure 1 is a view of a locking apparatus embodying the invention applied in the operative position to a vehicle.
Figure 2:
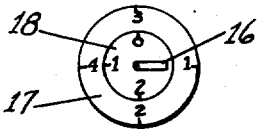
Figure 2 is a plan view of the same.
Figure 3:
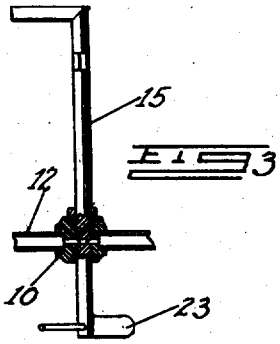
Figure 3 is a sectional view thereof.
Figure 4:
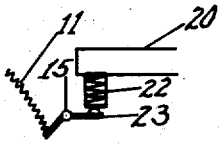
Figure 4 is a diagrammatic view showing the relation of the electromagnet to the valve operating means.

The device consists essentially of a spring closed fuel valve 10 which may be of any suitable type but which in the construction illustrated is provided with a normally acting closing spring 11 and which is arranged in the fuel feed line 12 between the reservoir or tank 13 containing the supply of fuel and the carbureter 14, with the usual or any ordinary operating stem or spindle 15 which is accessible to the operator and may be turned to open the valve which is normally held closed. In the construction illustrated the stem is provided with a grip or hand hold 16, and related with the stem is a combination locking device 17 of any conventional type serving to prevent the turning of the stem to open the valve until the proper combination has been set through the adjustment of an index member 18 serving to adjust the tumblers 19 in the lock casing. It will be understood that the specific construction of the lock mechanism forms no part of the present invention and that any suitable or conventional form of locking means serving to prevent the turning of the valve stem may be employed in this connection, but preferably the locking means should be such that when the valve stem turns to its valve closing position, the combination is broken or disarranged so that a manual setting thereof is required in order to permit of again turning the stem to open the valve.

In an electrical circuit 20 which includes the ignition generator 21 of the vehicle is arranged an electro-magnet 22 and carried by the valve stem is an armature 23 for attraction by the electro-magnet when the generator is in operation.

With this construction it is necessary that the motor be running and therefore that the generator be in action in order to energize the electro-magnet and attract the armature so as to hold the valve stem in a position to maintain the fuel feed valve open. As soon as the motor stops and therefore the operation of the generator ceases the electro-magnet becomes deenergized and releases the armature so that the valve closes and cuts off the supply of fuel. Obviously there may be a small residue of fuel in the carbureter which will prove to be sufficient to start the motor but it will be sufficient only to carry it for a short distance and not adequate to permit of the continuous running of the car.

In order to start the car it is necessary after setting the combination in order to release the valve stem, to hold the valve by means of the grip 16 in an open position until the motor starts and actuates the generator so as to produce a current sufficient to cause the electro-magnet to attract and hold the armature and thus maintain the valve in an open position. The parts will then remain in running condition until the operation of the motor ceases whereupon the valve stem will be released as above indicated.

Having described the invention, what is claimed as new and useful is:—

1. A vehicle lock having a fuel valve yieldingly held in its closed position, a combination lock mechanism for normally preventing the opening movement of the valve, and means under the control of the generator of the vehicle ignition system for holding the valve in its open position.

2. A vehicle lock having a fuel feed valve yieldingly held in its closed position, a combination lock mechanism for normally preventing the opening movement of the valve, and means under the control of the generator of the vehicle ignition system for holding the valve in its open position and consisting of an electro-magnet in circuit with the generator, and an armature carried by the valve and exposed to the influence of the electromagnet when the valve is in its open position.

3. In combination with the power plant of a motor vehicle, means for automatically shutting off access of fuel to said power plant, a lock for holding said means in position of shutting off the fuel, and for releasing said means, and an element of the power plant of the vehicle so related to the shutting off means as to hold it out of exercise of its function, so long as said element is in operation.

CLEMENS TO KENTRUP.